---

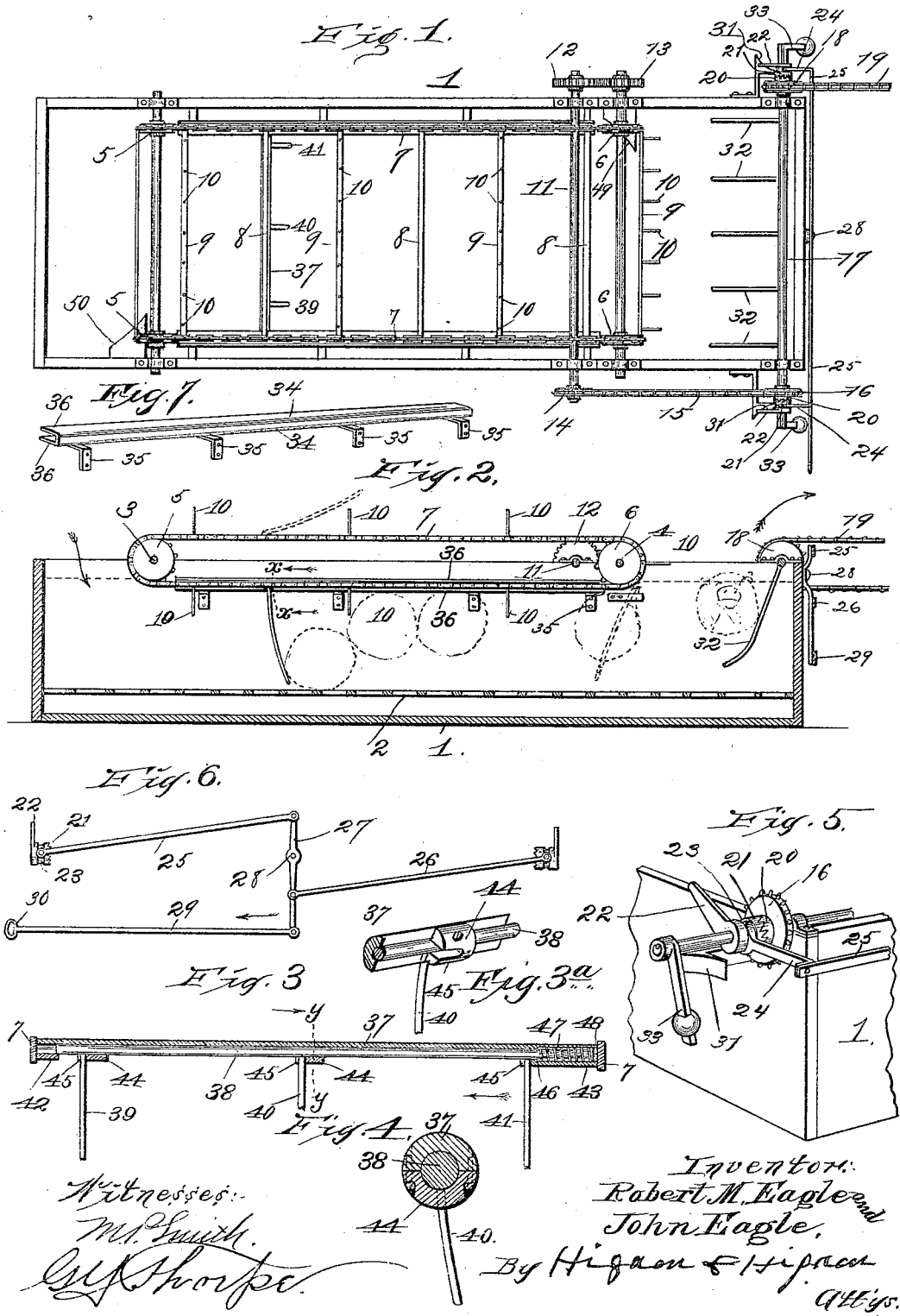

UNITED STATES PATENT OFFICE.

ROBERT M. EAGLE AND JOHN EAGLE, OF KANSAS CITY, KANSAS.

HOG-CONVEYER AND THROW-OUT FOR SCALDING-VATS.

SPECIFICATION forming part of Letters Patent No. 529,483, dated November 20, 1894.

Application filed September 29, 1893. Serial No. 486,765. (No model.)

*To all whom it may concern:*

Be it known that we, ROBERT M. EAGLE and JOHN EAGLE, of Kansas City, county of Wyandotte, Kansas, have invented certain new and useful Improvements in Hog-Conveyers and Throw-Outs for Scalding Vats or Tanks, of which the following is a full, clear, and exact description, reference being had to the accompanying drawings, forming a part hereof.

Our invention relates to apparatus for conveying hogs through and removing them from scalding vats or tanks, and the object of the invention is to produce an apparatus of this character which will positively and reliably convey every hog placed in the scalding vat or tank and deposit it upon the throw-out device, and which is simple, durable and comparatively inexpensive of construction.

Our invention consists in its general construction and novel combinations of parts, as hereinafter described and claimed.

Referring to the drawings, which accompany and illustrate this invention—Figure 1, represents a plan view of the apparatus constructed in accordance with our invention. Fig. 2, represents a vertical longitudinal sectional view of the apparatus. Fig. 3, is a vertical transverse section taken on the line *x—x* of Fig. 2. Fig. 3ª, is a detail perspective view of a portion of the rock-shaft and its bearing, and also showing the drag-arms carried by said rock-shaft. Fig. 4, is a vertical section taken on the line *y—y* of Fig. 3. Fig. 5, is a detail perspective view enlarged of one corner of the discharge end of the tank or vat, and showing the clutch arrangement for throwing the mechanism in and out of gear. Fig. 6, is a detail view showing the arrangement of the levers for operating the clutches. Fig. 7, is a detail perspective view of the chain-guard.

Before entering upon a detailed description of the invention, we wish to state that in scalding great numbers of hogs, they are usually fed successively into one end of a tank of water, and conveyed beneath the surface to the opposite end of the tank, the length thereof regulating the time they are submerged. This has previous to our invention, been accomplished by attendants walking beside the tank and holding the hogs beneath the surface with any suitable means. Among nearly every drove of hogs is found one or more slop-fed hogs, or "sinkers" as they are termed in packing house vernacular, and these hogs when placed in the vat of scalding water, sink at once to the bottom, and burn if not removed in the necessary time, thus entailing a loss to the proprietor of about ten or twelve dollars for every hog thus burned. To obviate this loss is one of the important objects of the invention, and to this end we provide a rock-shaft provided with drag-arms, which gather up "sinkers" and deposit them upon the throwout attachment.

Referring now to the drawings, where similar reference numerals designate like parts in all the figures: 1 designates a tank or vat of required length, which is supplied with a suitable quantity of scalding water to loosen the hair that it may be easily removed from the hogs. This tank or vat is provided with a grating 2, through which the dirt passes and settles upon the bottom of the tank or vat. Extending transversely of the tank or vat, a suitable distance from its front end, is a shaft 3 which is journaled in boxes carried by the sides of the tank, and arranged parallel with said shaft 3, is a similar shaft 4, the shaft 4 being also journaled in bearings carried by the sides of the tank and a suitable distance from the discharge end of the same. The shafts 3 and 4 are provided with similar and longitudinally aligned sprocket-wheels 5 and 6. A chain 7, connects the sprockets 5 and 6 at each side of the tank, and these chains are connected together at required intervals by cross-bars or rods 9 and similar bars or rods 8 provided with outwardly projecting teeth or fingers 10, the bars or rods 8 being arranged alternately with the bars or rods 9. If desired, the bars 9 may be provided with teeth or fingers as well as the bars or rods 8, but we prefer the former construction as it is cheaper and answers the purpose fully as well. Arranged a suitable distance forward of and parallel with the shaft 4, is a similar shaft 11, which also finds a bearing upon the sides of the tank and carries upon one end the gear-pinion 12, meshing with the pinion 13, upon the adjacent end of the shaft 4, and mounted upon the opposite end of the shaft 11, is a sprocket-pinion 14, which is connected by a chain 15, with a sprocket-wheel 16, mounted revolubly upon the shaft 17, extending transversely of and journaled in bearings upon the sides of the tank 1, at its rear or discharge end. Mounted revolubly upon the opposite end of the said shaft 17, is a similar sprocket-wheel 18, which is connected through the medium of the chain 19, with any suitable power mechanism. (Not shown.) The sprocket-wheels 16 and 18, are each provided with a hub toothed upon its outer face, at 20, and mounted so as to turn with and slide upon said shaft are a pair of clutch-sections 21; these clutch-sections being arranged outward of the sprocket-wheels 16 and 18, and adapted to simultaneously engage the toothed faces 20, at times as hereinafter explained. Each clutch-section 21, is provided with a radially extending arm at 22 at its outer end, and is also annularly grooved at 23, to receive the forked end of an arm 24, which extends rearwardly. A pair of parallel rods or bars 25 and 26, are pivoted at their outer ends to the rear ends of the arms 24, and are pivotally connected; the rod 25 to the upper end, and the rod 26, a suitable distance below to the vertically arranged lever 27, which is pivoted at 28, about midway between the engaging ends of the rods 25 and 26, to the adjacent outer end of the tank. A rod 29, provided with a handle-portion 30, at its outer end, is pivotally connected at its opposite end to the lower end of the lever 27. It will be seen from this arrangement, by pulling upon the handle rod 29, in the direction indicated by the arrow, that the lever 27, will be pivotally operated, and by thus pulling inwardly upon the rods 25 and 26, the clutch-sections 21, will be thrown into engagement with the toothed faces of the sprocket-wheels 16 and 18. Secured to the outer sides of the tank, a suitable distance below and in advance of the shaft 17, are a pair of brackets, and these brackets are provided at their outer ends with cam or beveled faces 31, occupying the same vertical plane as and lying in the path of the arms 22, when the clutch-sections 21, are in engagement with the clutch-sections of the sprocket-wheels 16 and 18. It will be seen from this arrangement, that each time the shaft 17, revolves, the arms 22, will come in contact with the cam or beveled faces 31, of the brackets, and in riding upon said faces will be moved outwardly until the clutch-sections 21, are disengaged from the sprocket-wheel clutches, the object of which is hereinafter explained.

Projecting downwardly from the shaft 17, into the rear end of the tank, and curving slightly forward at their lower edges, and arranged at proper intervals are a number of lift arms 32, and projecting downwardly and outwardly from the outer ends of the said shaft, are the weighted arms 33. These weighted arms may be dispensed with if desired, as the weight of the shaft and arms 32, will be ordinarily sufficient to insure the proper return of the shaft to its normal position, as hereinafter referred to in the operation of the device.

In order to protect the endless chains 7 from being clogged with hair, and also to prevent them from being pushed outwardly by the animals being scalded so that the animals shall be thoroughly immersed during their passage through the tank, we provide the chain-guards 34, which simply consist of castings U-shaped in cross-section, and of length to extend nearly from the sprocket-wheels 4, to the sprocket-wheels 5. These chain-guards are provided each with a number of right angle arms 35, which are screwed or bolted to the inner side of the tank; the guards being arranged so they shall occupy a horizontal plane with the lower portion of the chains interposed between the horizontal arms or flanges 36, thereof.

Extending transversely of the tank, connecting and preferably formed integral with a link of each chain 7, is a rod or bar 37, and this rod or bar is formed for its entire length with a bearing semi-circular in cross-section in which the rock-shaft 38 is journaled, said rock-shaft being of such length as to extend from one end nearly to the other of the rod or bar 37, and this shaft is provided with the drag-arms 39, 40 and 41; the arms 39 and 41, being near each end and the arm 40 about midway therebetween. Other intermediate arms may be employed if desired, but with a tank only about four or five feet wide additional arms would be unnecessary. A bearing cap 42, of sufficient width to always inclose or embrace the adjacent end of the rock-shaft 38, is bolted to the rod or bar 37, at one end, and a bearing cap 43 of greater width is bolted to the opposite end of the said rod or bar, so as to inclose the corresponding end of the shaft 38. Additional caps 44, embrace the shaft 38; one a suitable distance inward of the bearing cap 42, and the other about midway between said cap and the bearing cap 43. The outer margin of the cap 44, adjacent to the cap 42, is recessed or notched at 45, longitudinally of the shaft, and the corresponding margin of the other cap 44, and the cap 43, is also notched or recessed at 45, said notches 45 being arranged in longitudinal alignment. The internal diameter of the tubular bearing formed by the rod or bar and the cap 43, is enlarged from its outer end a suitable distance inward, so as to form the annular shoulder 46, and spirally surrounding said shaft is a spring 47, which bears at its opposite ends against the said annular shoulder and the collar or enlargement 48, upon the outer end of said shaft, and the tendency of this spring is to hold the shaft 38, in the position shown in Fig. 3, with the drag-arms 40, engaging the recesses or notches 45.

The general operation of the apparatus is as follows:—One hog or more is fed sidewise or laterally into the front end of the tank of scalding water and an attendant at the opposite end of the tank pulls the handle rod 29, outward, and throws the clutch-sections 21 into engagement with the revolving-sprocket-wheel 18, and the sprocket-wheel pinion 16, and these clutch-sections being keyed to slide upon the shaft cause the same to rotate or rock in the direction of the arrow, (Fig. 2). This movement in turn causes the operation of the conveyer consisting of the endless chains connected by the toothed or fingered bars, and these teeth or fingers are adapted to engage and force the hogs toward the opposite or discharge end of the tank, until the shaft 17, has completed about a half-revolution at which time the arms 22, coming in contact with the cam or beveled faces 31, are moved outwardly, and the clutch-sections are disengaged from the sprocket-pinion clutches. The shaft being now released by gravity resumes its original position, and is assisted to this position by the weighted arms 33. Immediately the said shaft is released, the movement of the conveyer is arrested also. This operation may be repeated several times before the hog first placed into the tank is deposited by the conveyer upon the lift-arms, and when this takes place the next operation of the shaft 17, lifts said hog and throws or deposits it upon a table, (not shown) adjacent to the discharge end of the tank. The hogs will be fed into the tank so that they will be a sufficient distance apart to allow the lift-arms 32, to remove a hog from the tank and then descend or fall, in time to receive the next succeeding one. The space between the rear end of the conveyer and the lift-arms is sufficient to accommodate two or three hogs, and is provided because it takes about one-third more time to scald the breast of the hog than it does the back. The arrangement is such that as soon as the hog is pushed clear of the rear end of the conveyer it rises immediately to the surface, the back uppermost always, thus allowing the breast to be subjected to the scalding operation until the hog is lifted from the tank by the lift-arms 32. Should any of the hogs prove to be sinkers and therefore descend beyond reach of the teeth or fingers of the conveyer, the drag-arms 39, 40, and 41, of the rock-shaft 38, will convey it or them toward the rear end of the tank as illustrated in Fig. 2, and deposit it or them upon the lift-arms 32. As the rock-shaft 38 reaches the rear end of the conveyer, the arm 41, at the right-hand side of the same comes in contact with the cam or inclined face 49, of a bracket secured to the side of the tank, and as the shaft is carried upwardly the resistance offered to said arm 41, causes the shaft to move longitudinally in the direction indicated by the arrow, Fig. 3, until the arms 39, 40, and 41 are disengaged from the recesses or notches 45, of bearing-caps 43, and 44. The continued upward movement of the said shaft owing to the aforesaid resistance now causes the shaft to be partially rotated about a quarter of a circle, to the position shown in Fig. 3ª, when the arm 41 clears the end of the cam or inclined face 49, and the spring forcing said shaft toward the right holds the drag-arms against the adjacent sides of the bearing-caps 43 and 44. The drag-arms hold this position owing to gravity, and the pressure of the spring 47, until the rock-shaft begins to descend at the forward end of the conveyer. Immediately this takes place, when past the center of gravity, the said arms fall over in the direction indicated by the arrow Fig. 2, and rock the shaft until the said arms are opposite the recesses or notches 45, when the spring 47 forces them immediately to enter. Should the spring fail to accomplish this from any cause and the arms swing past the recesses or notches 45, they will come in contact with the cam or inclined face 50, of a bracket carried at the inner side of the tank, and the resistance offered by this bracket to and the continued movement of the conveyer carrying the rock-shaft, causes the said shaft to be rotated until the said drag-arm clears the cam or inclined face, and the spring simultaneously pulls the drag-arms into their respective recesses or notches, so that they may be again in position to convey any sinkers to the discharge end of the tank. The number of these rock-shafts carrying drag-arms will depend upon the distance the conveyer has to travel. It will be understood that a cross-rod connecting the chains, and provided with drag-arms might be employed to swing the arms when the discharge end of the conveyer is reached, so as not to raise the hogs at that point or to interfere with the operation of the throwout attachment, and other arrangements for this purpose might be used; therefore we do not wish to confine ourselves to the specific construction herein shown and described.

From the above description, it will be seen that we have provided an apparatus, whereby, all hogs may be conveyed positively and reliably through the scalding vat or tank, and an apparatus which is comparatively inexpensive, simple, strong and durable of construction.

Having thus described our invention, what we claim as new, and desire to secure by Letters Patent, is—

1. In an apparatus of the character described, the combination with an endless conveyer provided with teeth or fingers and a rock-shaft provided with lift-arms, and operatively connected to the endless conveyer, and wheels mounted loosely upon said shaft, and provided with clutch faces, of a pair of clutches keyed to slide upon and revolve with said shaft, and means to move said slidable clutches into engagement with the said wheels, substantially as and for the purpose set forth.

2. In an apparatus of the character described, the combination with an endless conveyer provided with teeth or fingers and a rock-shaft provided with lift-arms, and operatively connected to the endless conveyer, and wheels mounted loosely upon said shaft, and provided with clutch faces, and arms projecting from said slidable clutches, of a pair of brackets secured to the tank and provided with cam or beveled faces against which the clutch arms are adapted to contact, substantially as and for the purpose set forth.

3. In an apparatus of the character described, the combination with a tank or vat, and an endless conveyer, consisting of a pair of chains suitably guided, and a number of toothed or fingered bars or rods connecting said chains, of a pair of chain-guards carried by the said tank and embracing the upper and lower sides of the lower portion of said chains, substantially as set forth.

4. In an apparatus of the character described, the combination with a tank or vat, and an endless conveyer carried thereby, of a drag-attachment carried by said conveyer, consisting of a rock-shaft provided with arms, and means to automatically rock said drag attachment when it reaches the discharge end of the conveyer, substantially as and for the purpose set forth.

5. In an apparatus of the character described, the combination with a tank or vat, an endless conveyer carried by said tank or vat, and means to intermittently operate said conveyer, and a rod or bar bearing caps carried by said rod or bar, and certain of said caps provided with recesses or notches, of a rock-shaft journaled between said rod or bar and said caps, and provided with drag-arms, and a spring actuating said shaft so that the said arms shall normally engage said recesses or notches, and means to longitudinally and revolubly operate the said rock-shaft when it reaches the discharge end of the conveyer, substantially as set forth.

6. In an apparatus of the character described, the combination with a tank or vat, an endless conveyer carried thereby, and means to intermittently operate said conveyer, a rod or bar, bearing caps carried by said rod or bar, a shaft provided with drag-arms, and journaled between said rod or bar and said caps, and a spring normally holding said shaft so that said arms shall engage the notches of said bearing-caps, of a bracket carried near the discharge end of the tank and provided with a cam or inclined face, and adapted to overcome the resistance of said spring and longitudinally and revolubly operate the rock-shaft and a bracket carried at the front end of the tank, and provided with a cam or beveled or inclined face which is also adapted to rock the said shaft until the arms are opposite the notches of the bearing caps, substantially as and for the purpose set forth.

In testimony whereof we affix our signatures in the presence of two witnesses.

ROBT. M. EAGLE.
          JOHN EAGLE.

Witnesses:
  WILLIAM McFADDEN,
  ED. C. HOUSTON.